United States Patent [19]

Ivannikov

[11] Patent Number: 4,806,722
[45] Date of Patent: Feb. 21, 1989

[54] SWIVEL-HEAD WELDING TORCH FOR GAS-SHIELDED NONCONSUMABLE-ELECTRODE ARC WELDING

[75] Inventor: Alfred V. Ivannikov, Leningrad, U.S.S.R.

[73] Assignee: Vsesojuzny Nauchno-Issledovatelsky Proektno-konstruktorsky I Tekhnologichesky Institut Elektrosvarochnogo Oborudovania, Leningrad, U.S.S.R.

[21] Appl. No.: 167,142

[22] PCT Filed: Sep. 29, 1986

[86] PCT No.: PCT/SU86/00093
§ 371 Date: Oct. 28, 1987
§ 102(e) Date: Oct. 28, 1987

[87] PCT Pub. No.: WO88/02295
PCT Pub. Date: Apr. 7, 1988

[51] Int. Cl.[4] .............................. B23K 9/24
[52] U.S. Cl. ............................ 219/75; 219/136
[58] Field of Search ..................... 219/75, 136

[56] References Cited

U.S. PATENT DOCUMENTS

| 2,743,346 | 4/1956 | Scholl | 219/75 |
| 2,986,624 | 5/1961 | Marta | 219/75 |
| 4,145,595 | 3/1979 | Keller et al. | 219/75 |
| 4,361,747 | 11/1982 | Torrani | 219/75 |

FOREIGN PATENT DOCUMENTS 230345 3/1969 U.S.S.R. .
1175637 8/1985 U.S.S.R. .

Primary Examiner—Clifford C. Shaw
Attorney, Agent, or Firm—Fleit, Jacobson, Cohn & Price

[57] ABSTRACT

A welding torch comprises a head (1) and two current-supply conduits (3) which are held with one of their ends to a body (7) of the torch. The current-supply conduits (3) are connected to the head (1) through connectors (5) held at the other ends of the conduits (3) so as to face each other. The connectors (5) are fitted into holes (2) provided in the head (1) and so shaped as to suit the shape of the external surface of the connectors (5). Through ducts (10) are provided in the connectors (5) to establish communication between the interior space of the head (1) and that of the current-supply conduits (3).

1 Claim, 3 Drawing Sheets

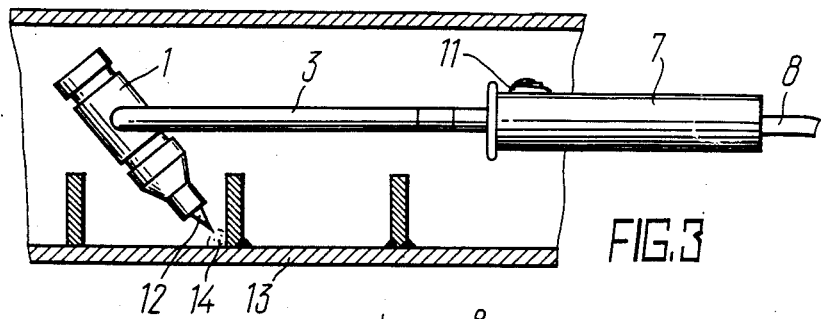
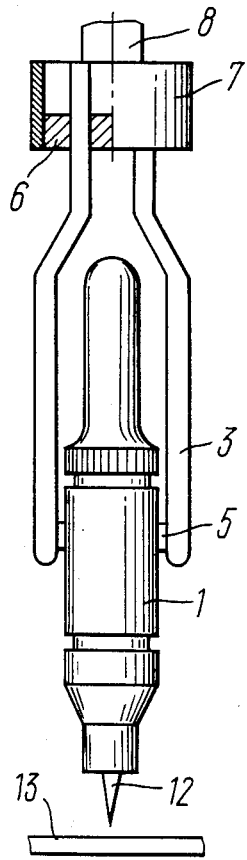
FIG.3
FIG.4

SWIVEL-HEAD WELDING TORCH FOR GAS-SHIELDED NONCONSUMABLE-ELECTRODE ARC WELDING

TECHNICAL FIELD

The invention relates generally to arc welding of metals and more specifically, to swivel-head welding torches for gas-shielded nonconsumable-electrode arc welding.

BACKGROUND OF THE INVENTION

Known in the present state of the art is a swivelhead welding torch for gas-shielded nonconsumable-electrode arc welding, comprising a body, a swivel head mounted thereon, and current- and gas-supply cables and hoses (cf. USSR Inventor's Certificate No. 230,345, Cl.B23 K 9/16, June 28, 1966).

The torch head is made sectional and is a two-piece construction, each of the sections being swivelling with respect to the other, the plane of jointing making predominantly an angle of 45° with the axis of the torch body.

Since the torch construction fails to provide a simple turning of its head in a single plane, a correction is to be introduced to compensate for a lateral angle of the head inclination which is liable to form every time and is not always desirable, due to swivelling the torch body in an opposite direction with respect to its longitudinal axis. As a result, the torch head rigidly fixed in the body assumes a position inconvenient for the operator, whereby the operator's fatigue is enhanced and labour productivity is reduced. An inconvenient position of the head is augmented due to an unrestricted angle of the head swivel, which is within 90 to 180 degrees with respect to the axis of the torch body.

Furthermore, a close arrangement of the current leads and gas supply hoses to the torch head that is liable to become heated during the welding process, affects adversely the service life of the current leads and gas hoses and of the torch as a whole. The welding torch features comparatively high specific materials consumption and but low maintainability of its construction.

Another prior-art swivel-head welding torch for gas-shielded nonconsumable-electrode arc welding (cf. U.S. Pat. No. 2,986,624, Cl. 219–75, May 30, 1961) is known to comprise a head, two current-supply conduits provided with external electric insulation and held with one of their ends to the torch body and with the other end, connected to the head.

The shielding gas is fed to the torch head along a third conduit which is also held with one of its heads to the torch body, and with the other end, is connected to the head. The junction unit of all the three conduits to the head serves at the same time as the jointing unit of the swivel head which is cooled with water passing along the current-conduction conduits forming a loop soldered to the stationary portion of the unit along the the outside perimeter of the head. Soldered to the same stationary portion of the unit is also the gas-supplying conduit which communicates with an annular gas chamber of the swivel unit, said chamber being isolated from the jointing plane of the swivel unit with a sealing cup of an elastoplastic material, to prevent the gas from escaping therefrom. The head serves at the same time as a movable member of the swivel unit, through which a duct runs which communicates the head interior with the gas chamber of the swivel unit. Both the movable and the stationary members of the swivel unit are locked in place with a screw at a preselected angle of swivel. Such a construction arrangement of the welding torch is too complicated and fails to provide the torch head swivel to an angle exceeding 180°, since such a swivel is prevented by the conduits rigidly connected to the stationary member of the swivel unit. Moreover, whenever the angle of the head swivel is to be changed, the screw of the swivel unit has to be undone and retightened, which results in that the head is arranged inconveniently for the operator and in the affected adversely operator's labour productivity. Rigidly fastened gas- and current-supply conduits in the torch body prevent adjustment of the torch as for length and rotation of the torch head with respect to the longitudinal axis of the torch body, which involves difficulties concerned with sophisticated welding techniques, or in some cases imposes much restriction upon the field of application of such a welding torch. In addition, provision of a water cooling system for the torch either renders it inapplicable for operation in the open air at subzero temperatures of the ambient air, or involves material sophistication of the equipment due to the use of a special closed-circuit forced-recirculation cooling system employing anti-freeze solutions as coolants.

Application of a torch without water cooling is not allowed from the standpoint of construction, which restricts substantially the field of the torch application.

DISCLOSURE OF THE INVENTION

The main object of the present invention is to provide a swivel-head welding torch for gas-shielded nonconsumable-electrode arc welding, featuring such a connection of the current-supply conduits to the torch head and body and a current and gas fed system that would enable the torch head to swivel without restriction of an angle of swivel as well as make it possible to control the length of the torch, to simplify the torch construction, increase the labour productivity of a welding operator, and extend the field of the torch application.

This object is accomplished due to the fact that in a swivel-head welding torch for gas-shielded nonconsumable-electrode arc welding, comprising a head, two current-supply conduits provided with external electric insulation and held with one of their ends to the torch body, while the other ends of said conduits are connected to the head, according to the invention, the current-supply conduits are connected to the head through cable connectors secured at the ends of the current-supply conduits and facing each other, and holes adapted to accept said cable connectors, said holes being provided in the head and shaped so as to suit the form of the outer surface of the cable connectors; in addition, the current-supply conduits communicate with a source of gas, while the cable connectors are provided with through ducts, whereby the head interior communicates with the hollow space of the current-supply conduits which are spring-actuated with respect to the head and are longitudinally traversable and turnable with respect to the torch body.

The proposed invention makes it possible to simplify the construction of the torch, reduce its overall dimensions and mass without affecting the rated welding amperage and duty factor, diminish the welding operator's fatigue, improve labour conditions and increase operator's labour productivity, render the torch more maintainable and considerably extend the field of its application.

BRIEF DESCRIPTION OF THE DRAWINGS

In what follows the present invention will be illustrated in some specific embodiments thereof with reference to the accompanying drawings, wherein:

FIG. 3 is a general diagrammatic view of a manual-welding torch while in working position for welding in a hard-of-access place, according to the invention; and FIG. 4 is a general diagrammatic view of a mechanized-welding torch, according to the invention.

BEST MODE FOR CARRYING OUT THE INVENTION

Figure 1:
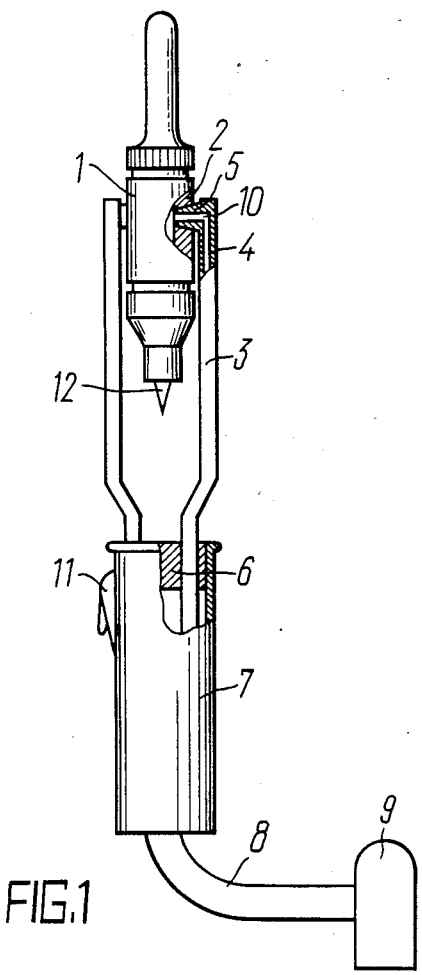
FIG. 1 is a general diagrammatic view of a manual-welding torch while in working position, according to the invention.

A swivel-head welding torch for gas-shielded nonconsumable-electrode arc welding comprises a head 1 (FIG.1), wherein two diametrically opposite holes 2 are provided, and two current-supply conduits 3 covered by an external electric insulation 4. The conduits 3 are connected to the head 1 with the aid of connectors 5 secured at the ends of the conduits 3 and facing each other. The connectors 5 are fitted into the holes 2 which are so shaped as to follow the form of the outer surface of the connectors 5. The other end of each of the conduits 3 is set in an insert 6 accommodated a torch body 7 rotatably with respect to the body longitudinal axis and with a possibility of being held in a required position. In addition, the conduits 3 are spring-actuated and are longitudinally traversable with respect to the insert 6 and the body 7, which enables the torch length to be increased or reduced due to extending the conduits 3 from the insert 6 and the body 7 for welding in hard-of-access places. The conduits 3 are also connected to a gas source 9 through a current- and gas-supply hose 8, and the connectors 5 are provided with through ducts 10 which communicate the interior space of the head 1 with that of the conduits 3. A button 11 is provided on the body 7 for control of the torch operation.

Figure 2:
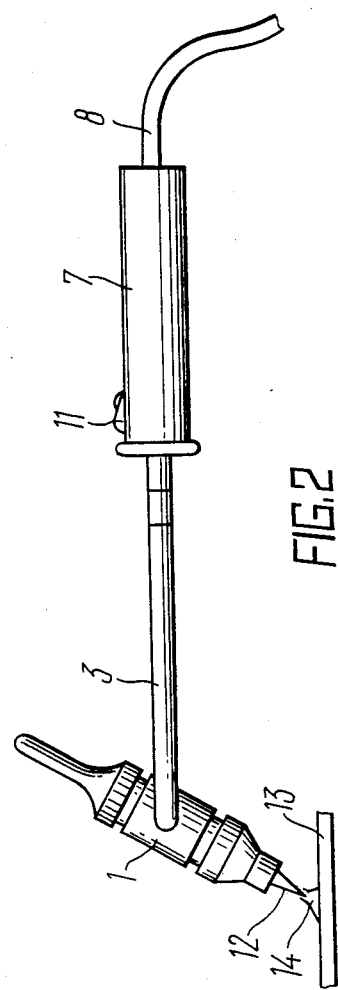
FIG. 2 is a general diagrammatic view of a manual-welding torch while in working position, according to the invention.

A welding arc 14 (FIGS. 2,3) is initiated between a nonconsumable electrode 12 and a workpiece.

The herein-proposed torch is successfully applicable in the mechanized welding as well. A possible alternative embodiment of a torch for mechanized welding is illustrated in FIG. 4. In this case the torch body 7 is arranged in a plane square with the plane of arcing, while the height of arrangement of the head 1 above the surface of the workpiece 13, the angle of tilt of the electrode 12 in the various spotial planes are easily attainable by extending the conduits 3 from the insert 6 and the body 7 through rotating the head 1 round an axis passing through the connectors 5 and by turning the insert 6 along with the conduits 3 and the head 1 with respect to the longitudinal axis of the body 7. No special compensation, traversing and turning mechanisms are to be resorted to, which is the case with the heretofore-known constructions of automatic arc-welding machines, which materially simplifies the construction of the welding torch, reduces its specific matefials consumption and decreases its overall dimensions.

The welding torch of the invention operates as follows. Depending on what an operator's hand is operative (i.e., right or left in case of manual welding), one should adjust the head 1 (FIGS. 2, 3) by turning it through a required angle to the axis of the body 7 and by arranging the latter so that the control button 11 should be in a position convenient for the operator. Then the supply voltage and the shielding gas are fed along the hose 8 connected to the conduits 3, either by pressing the button 11, or remotely from the control panel (in case of mechanized welding). The shielding gas flows along the conduits 3 and the ducts 10 in the connectors 5 (FIG. 1) to get into the interior of the head 1.

The thus-adjusted torch having been arranged in a required place, one should strike the welding arc 14 (FIGS. 2, 3) between the nonconsumable electrode 12 and the workpiece 13 and start the welding process. The welding current in this case is supplied from a current source (omitted in the drawings) along the same pathway as the gas flows, i.e., along the current-and gas-supply hose 8 through the conduits 3 and the connectors 5 (FIG. 1) tightly fitted into the holes 2 provided in the head 1.

The connectors 5 may be made as, e.g., cone frustums, spherical-shaped, or have any other shape, whereas the holes 2 in the head 1 should be of the corresponding shape, so as to follow the external surface of the connectors 5 and tightly envelop the latter.

Such a junction of the head 1 with the conduits 3 makes possible their rotation with respect to one another and quick disjointing (whenever emergency repair is necessary) by merely bringing the spring-actuated conduits 3 apart. That is why the angle of swivel of the head 1 is unrestricted and can be selected within 0 to 360 degrees, which provides for much convenience for operation with either hand (in case of manual welding) in every spatial attitude, makes it possible to allow for a welding operator's individual manner of using the control button 11 (located on the torch body 7) from either side, and extends considerably the field of the torch application in extremely embarrassing or hard-of-access places (FIG. 3). All the aforesaid is also enhanced by the longitudinal traversability and turnability of the conduits 3 relative to the axis of the torch body 7.

It is due to the provision of the insert 6 accommodated in the body 7 rotatably round the axis thereof that the conduits 3 along with the head 1 can also be rotated or swivelled round the same axis of the torch body 7.

Unlike a unilateral shielding gas supply in the heretofore-known welding torches, a bilateral gas supply to the head 1 via the connectors 5 carried out in the proposed welding torch provides for a uniform gas discharge from the torch to protect the welding zone, whereby the construction of the inner components of the head 1 can be simplified.

The present welding torch is simple to manufacture, features relatively low specific materials consumption, needs no water cooling and is capable of operating at high welding amperage (200 A and over) and a 100-percent duty factor.

The aforelisted constructional features of the welding torch, as compared with the traditional technical solutions, considerably improve the operator's labour conditions, reduce his fatigue, increase labour productivity, render the torch more maintainable, as well as extend much the field of the torch application, especially under erection conditions when welding in hard-of-access or embarrassing places in the case of weld positions other than the downhand.

INDUSTRIAL APPLICABILITY

The present invention can find application in making various welded structures and weldments from ferrous and nonferrous metals and alloys thereof.

What is claimed is

1. A swivel-head welding torch for gas-shielded non-consumable-electrode arc welding, comprising a head (1) two current-supply conduits (3) provided with external electric insulation (4) and held with one of their ends to the torch body (7), while the other ends of the conduits are connected to the head (1), characterized in that the current-supply conduits (3) are connected to the head (1) through connectors (5) held at the ends of the current-supply conduits (3) and facing each other, and holes (2) adapted to accept the connectors (5), said holes being provided in the head (1) and shaped so as to suit the shape of the external surface of the connectors (5) and besides that the current-supply conduits (3) communicate with a gas source (9), while the connectors (5) have through ducts (10) which establish communication between the interior space of the head (1) and that of the current-supply conduits (3) which adjoin tightly the head (1) and are mounted longitudinally transversable and turnable with respect to the torch body (7).

* * * * *